United States Patent
Cobb et al.

(10) Patent No.: US 10,781,892 B2
(45) Date of Patent: Sep. 22, 2020

(54) PRESS-FIT CHECK VALVE FOR A HYDRAULIC TENSIONER RESERVOIR WITH METERED BACKFLOW

(71) Applicant: BorgWarner Inc., Auburn Hills, MI (US)

(72) Inventors: Keith B. Cobb, Cortland, NY (US); Matthew W. Crump, Cortland, NY (US); Dale N. Smith, Freeville, NY (US)

(73) Assignee: BorgWarner Inc., Auburn Hills, MI (US)

( * ) Notice: Subject to any disclaimer, the term of this patent is extended or adjusted under 35 U.S.C. 154(b) by 334 days.

(21) Appl. No.: 15/748,700

(22) PCT Filed: Jul. 25, 2016

(86) PCT No.: PCT/US2016/043831
§ 371 (c)(1),
(2) Date: Jan. 30, 2018

(87) PCT Pub. No.: WO2017/023592
PCT Pub. Date: Feb. 9, 2017

(65) Prior Publication Data
US 2019/0003557 A1    Jan. 3, 2019

Related U.S. Application Data

(60) Provisional application No. 62/199,482, filed on Jul. 31, 2015.

(51) Int. Cl.
*F16H 7/08*   (2006.01)
*F01L 1/02*   (2006.01)
(Continued)

(52) U.S. Cl.
CPC ............... *F16H 7/08* (2013.01); *F01L 1/022* (2013.01); *F16K 15/044* (2013.01);
(Continued)

(58) Field of Classification Search
CPC .. F16H 7/08; F16H 7/0836; F16H 2007/0814; F16H 2007/0859; F01L 1/022;
(Continued)

(56) References Cited

U.S. PATENT DOCUMENTS

| 2,167,721 A | 8/1939 | La Brie |
| 2,273,737 A | 2/1942 | Snyder |

(Continued)

FOREIGN PATENT DOCUMENTS

| JP | 10306857 A | 11/1998 |
| JP | 2002257251 A | 9/2002 |

(Continued)

OTHER PUBLICATIONS

International Search Report for PCT/US2016/038306 dated Aug. 24, 2016.
(Continued)

*Primary Examiner* — Michael R Mansen
*Assistant Examiner* — Robert T Reese
(74) *Attorney, Agent, or Firm* — Brown & Michaels, PC (57) ABSTRACT

A press-fit check valve for a hydraulic tensioner includes a retainer, a seat, a ball, and a spring. The seat of the check valve is press-fit against the wall of the check valve counterbore of the hydraulic tensioner body. In some embodiments, the seat is cup-shaped to provide a predetermined level of press force retention of the press-fit check valve. In some embodiments, the seat includes a plurality of legs separated by leg openings. In some embodiments, a backflow path is provided past the press-fit check valve by a combination of the leg openings and at least one backflow (Continued)

slot through a flange of the retainer. In some embodiments, a lip at the outer end of the check valve counterbore prevents the seat from backing out of the check valve counterbore.

12 Claims, 7 Drawing Sheets

(51) Int. Cl.
  *F16K 15/04* (2006.01)
  *F16K 27/02* (2006.01)
(52) U.S. Cl.
  CPC ...... *F16K 27/0209* (2013.01); *F16K 27/0245* (2013.01); *F16H 2007/0814* (2013.01); *F16H 2007/0859* (2013.01)
(58) Field of Classification Search
  CPC . F16K 15/044; F16K 27/0209; F16K 27/0245
  See application file for complete search history.

(56) References Cited

U.S. PATENT DOCUMENTS

| | | | |
|---|---|---|---|
| 3,304,952 | A | 2/1967 | Krone |
| 3,437,065 | A | 4/1969 | Robbins, Jr. |
| 5,449,018 | A | 9/1995 | Harris |
| 5,700,213 | A | 12/1997 | Simpson et al. |
| 5,707,309 | A | 1/1998 | Simpson |
| 5,913,742 | A | 6/1999 | Nakamura et al. |
| 6,142,168 | A | 11/2000 | Sumrall |
| 6,322,468 | B1 | 11/2001 | Wing et al. |
| 6,435,993 | B1 | 8/2002 | Tada |
| 10,006,524 | B2 | 6/2018 | Crump et al. |
| 10,107,367 | B2 | 10/2018 | Kunimatsu et al. |
| 10,260,603 | B2 | 4/2019 | Kurematsu |
| 2001/0032675 | A1 | 10/2001 | Russell |
| 2004/0154666 | A1 | 8/2004 | Gessat et al. |
| 2004/0194828 | A1 | 10/2004 | Landhuis |
| 2005/0227799 | A1 | 10/2005 | Yoshida |
| 2005/0265856 | A1 | 12/2005 | Yoshida |
| 2009/0111628 | A1 | 4/2009 | Poiret et al. |
| 2011/0278775 | A1 | 11/2011 | Germano et al. |
| 2012/0329590 | A1 | 12/2012 | Yoshii et al. |
| 2015/0252878 | A1 | 9/2015 | Kitano et al. |
| 2015/0267789 | A1* | 9/2015 | Kurematsu ............... F16H 7/08 474/110 |
| 2019/0277370 | A1* | 9/2019 | Iwasaki .................... F16H 7/08 |

FOREIGN PATENT DOCUMENTS

| | | |
|---|---|---|
| JP | 2005344738 A | 12/2005 |
| JP | 2006144877 A | 6/2006 |
| JP | 2006322521 A | 11/2006 |
| JP | 2007010129 A | 1/2007 |
| JP | 201112732 A | 1/2011 |
| WO | 2014061593 A1 | 4/2014 |

OTHER PUBLICATIONS

International Search Report for PCT/US2016/041974 dated Sep. 12, 2016.
International Search Report for PCT/US2016/043831 dated Nov. 2016.

* cited by examiner

PRESS-FIT CHECK VALVE FOR A HYDRAULIC TENSIONER RESERVOIR WITH METERED BACKFLOW

BACKGROUND OF THE INVENTION

Field of the Invention

The invention pertains to the field of valves. More particularly, the invention pertains to a check valve for a hydraulic tensioner.

Description of Related Art

A chain tensioner is used to control the chain and take up slack as the chain travels around a plurality of sprockets. The slack of the chain varies as the temperature in an engine increases and as the chain wears. When a chain wears, the chain elongates and the slack in the chain increases. The increase in slack may cause noise, slippage, or tooth-jumping between the chain and the sprocket teeth. If the increase of the slack in the chain is not taken up in the case of an engine with a chain-driven camshaft, the engine may be damaged, because the camshaft timing is misaligned by a certain angle due to slippage or tooth jumping.

A hydraulic tensioner uses hydraulic fluid to maintain tension in the chain and conventionally includes at least one check valve. Oil must flow through the check valve and into a high pressure chamber of the tensioner as the piston extends to take up chain slack. If the flow restriction of the check valve is too great, the piston does not have enough oil volume to support its extended length. As the chain begins to push the piston back into the tensioner, the oil tries to flow back out of the check valve. At this point the check valve ball must move back to seal off the oil passage. If the response time is too slow, it takes too long to build up the necessary pressure to support the piston and chain control becomes an issue. Both of these functions of the check valve affect the performance of a hydraulic tensioner.

In hydraulic tensioners, a drop-in check valve assembly is conventionally utilized within the high pressure chamber. These assemblies have a plastic component that may be used to provide metered backflow of hydraulic fluid into the reservoir. The check valve assembly mates to the plastic component to form a seal with the tensioner body or a vent if metered backflow of the hydraulic fluid is required. When the pressure of the hydraulic fluid in the piston bore becomes greater than the pressure of the hydraulic fluid in the hydraulic fluid reservoir due to pressure from the tensioned chain, a backflow path allows backflow of some of the hydraulic fluid in the piston bore to retract the piston and relieve some of the pressure in the piston bore.

SUMMARY OF THE INVENTION

A press-fit check valve for a hydraulic tensioner includes a retainer, a seat, a ball, and a spring. The seat of the check valve is press-fit against the wall of the check valve counterbore of the hydraulic tensioner body. In some embodiments, the seat is cup-shaped to provide a predetermined level of press force retention of the press-fit check valve. In some embodiments, the seat includes a plurality of legs separated by leg openings. In some embodiments, a backflow path is provided past the press-fit check valve by a combination of the leg openings and at least one backflow slot through a flange of the retainer. In some embodiments, a lip at the outer end of the check valve counterbore prevents the seat from backing out of the check valve counterbore.

In some embodiments, a check valve for press-fitting into a check valve counterbore of a hydraulic tensioner body includes a retainer, a seat, a ball, and a spring. The retainer includes an open retainer end, a closed retainer end opposite the open retainer end, a cylindrical sidewall extending between the open retainer end and the closed retainer end, and at least one retainer opening extending through the cylindrical sidewall. The retainer sidewall includes a retainer flange at the open retainer end. The seat includes a cup-shaped seat wall having a radially-symmetric profile tapering from a first open end to a second open end and having a shoulder between the first open end and the second open end. The shoulder contacts the retainer flange. A seat opening extends through the seat and a cavity is formed between the retainer and the seat. The first open end of the seat is press-fittable to a cylindrical wall of the check valve counterbore. The ball is received in the cavity. The second open end of the seat is sealable by the ball. The spring is received in the cavity and has a first end contacting the retainer and a second end contacting the ball to bias the check valve toward a closed position with the ball sealing the seat opening.

In other embodiments, a hydraulic tensioner includes a hydraulic tensioner body having a check valve counterbore and the check valve press-fit into the check valve counterbore.

In other embodiments, the check valve includes a retainer includes an open retainer end, a closed retainer end opposite the open retainer end, a cylindrical sidewall extending between the open retainer end and the closed retainer end, and at least one retainer opening extending through the cylindrical sidewall. The retainer sidewall includes a retainer flange at the open retainer end. The check valve also includes a seat having a first open end, a second open end opposite the first open end, a shoulder between the first open end and the second open end contacting the retainer flange to form a cavity between the retainer and the seat, and a seat opening extending through the seat. The check valve also includes a ball received in the cavity and seating in the second open end of the seat. The check valve also includes a spring received in the cavity and having a first end contacting the retainer and a second end contacting the ball to bias the check valve toward a closed position with the ball seated in the second open end of the seat to seal the seat opening. The seat includes a plurality of legs at the first open end separated by leg openings. The legs are press-fit to a cylindrical wall of the check valve counterbore.

DETAILED DESCRIPTION OF THE INVENTION

A check valve assembly is press-fit in a check valve counterbore located in the hydraulic fluid reservoir of a hydraulic tensioner. Improper press-fitting may lead to movement of the check valve in the check valve counterbore and improper control of hydraulic fluid flow by the check valve. Conventionally for press-fit parts, a tight tolerance is required on mating parts to maintain the press-fit during operation. In some embodiments, the press-fit check valve includes one or more features that reduce the tolerance and the cost of production of the press-fit check valve, production of the tensioner body, or assembly of the hydraulic tensioner. In some embodiments, the check valve seat is mated with a retainer of the hydraulic tensioner to capture components of the check valve, including, but not limited to, a ball or disk and a spring.

In some embodiments, the valve seat includes a cup-shaped profile. "Cup-shaped", as used herein, may be any radially-symmetric profile tapering from a first open end to a second open end that may include straight or curved sections to form the shape of the walls of a cup. The cup-shaped profile preferably includes a shoulder, which contacts the bottom surface of the retainer flange in the assembled check valve. In such embodiments, the valve seat wall is preferably of a substantially uniform thickness from the first open end to the second open end and is preferably formed from a single piece of sheet metal. In some embodiments, the valve includes a set of at least two legs to improve retention and allow a backflow path of hydraulic fluid, which is typically oil, into the hydraulic fluid reservoir. In some embodiments, the cup design includes two legs. In other embodiments, the cup design includes four legs. In yet other embodiments, the cup design includes six or more legs.

In some embodiments, the legs are separated by arched openings having a concave shape. In some embodiments, the legs are scalloped legs with scalloped openings separating the legs.

Methods of forming the cup design of the seat may include, but are not limited to, stamping and deep drawing processes. The seat is preferably made of steel. In a stamping process, a flat sheet metal is placed in a stamping press, and a tool and die surface presses the metal into the desired shape. In a deep drawing process, a flat piece of sheet metal is radially drawn into a forming die by the mechanical action of a punch.

The cup is preferably shaped to provide a predetermined level of press force retention of the press-fit check valve. Adjusting the length and angle of the counterbore-contacting portion of the seat (i.e., the legs in embodiments with legs), the contact surface area, and the bore surface finish adjusts the press force retention level. Increasing the contacting angle from zero is expected to increase interference force and retention, but at some point it is expected that failure or yielding of the material may occur if the angle becomes too large. Increasing the length is expected to increase contact area and improve retention. Increased surface roughness is expected to increase friction between the press-fit surfaces and improve retention. In some embodiments, counterbore machining tolerances may be opened up to reduce part cost.

The check valve assembly preferably eliminates at least one conventional component, a plastic seal, reducing complication of the assembly process.

Additionally, other retention methods may be used in conjunction with the press-fit seat. A check valve counterbore with a slight undercut may be used to produce a lip to act as a snap into the counterbore and prevent backing out. Swaging of the material after inserting the valve may be used to decrease the diameter of the counterbore, thereby preventing the parts from translating in the axial direction. In alternative embodiments, swaging of the seat to increase its outer diameter may be possible if done carefully to prevent cracking or otherwise damaging the check valve. Swaging is a process of forging, where the dimensions, commonly the diameter, of an item are altered using dies into which the item is forced. Laser welding the seat into the bore through typical welding adhesion may be used either to produce a ring of raised material created through laser heat penetration that acts as a material stop or to improve retention through roughening of the surface.

With the elimination of the plastic component conventionally used to form a vent or a seal with the tensioner body, metered backflow is preferably achieved by utilizing a single orifice or multiple orifices of a given size or sizes directly in the retainer flange. The orifices may be formed as part of the stamping or deep drawing process with secondary machining, or smaller diameters may be created through a water jet or a laser. Openings in the seat cup between the legs provide a backflow path past the seat and into the hydraulic fluid reservoir.

Forming, machining, or laser-cutting may be used to produce a flow path or tortuous path on the top of the retainer flange or on the mating component, which is the hydraulic tensioner body. The retainer is preferably made of steel. The retainer wall is preferably of a substantially uniform thickness from the flange at one end to the closed top at the other end and is preferably formed from a single piece of sheet metal. The retainer preferably includes the retainer flange at the open end of the retainer, a cylindrical sidewall extending from the retainer flange with at least one opening in the sidewall, and a closed end opposite the open retainer end.

Figure 1:
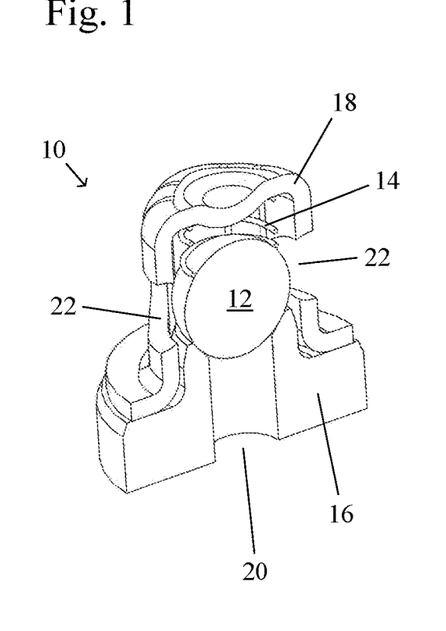
FIG. 1 shows a cross sectional perspective view of a ball-style check valve in an embodiment of the present invention.

Referring to FIG. 1, the ball-style check valve 10 includes a ball 12, a spring 14, a seat 16, and a retainer 18. The ball 12 and the spring 14 are held between the seat 16 and the retainer 18. The seat 16 includes a seat opening 20, against which the ball 12 is biased by the spring 14 to bias the check valve 10 toward the closed position shown in FIG. 1. Pressurized fluid flows into the check valve 10 through the seat opening 20 by pushing the ball 12 away from the seat 16, against the bias of the spring 14, such that the check valve 10 moves to an open position. The retainer 18 includes at least one retainer opening 22 for pressurized fluid flow out of the check valve 10, when the check valve 10 is in an open position.

Figure 2:
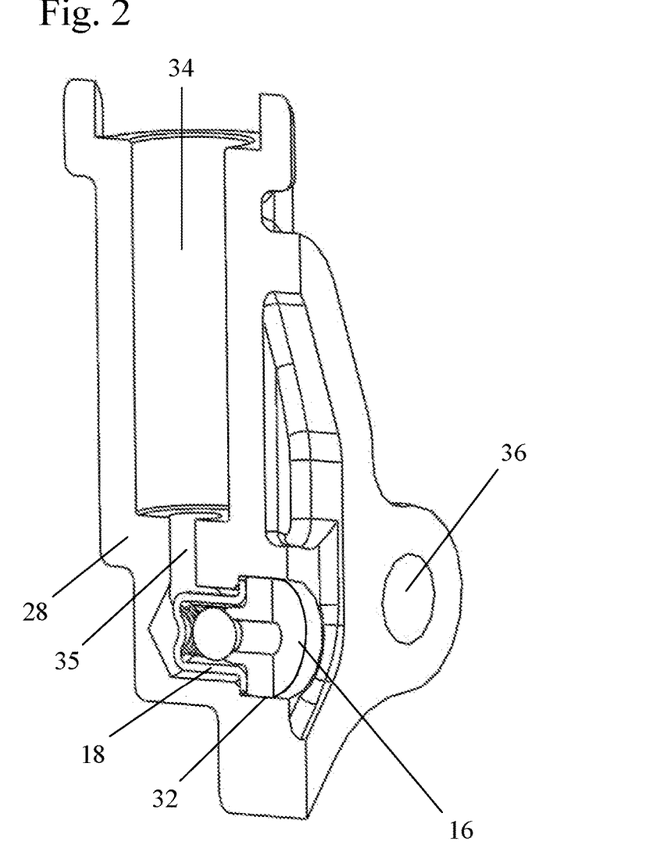
FIG. 2 shows a cross sectional perspective view of the check valve of FIG. 1 press-fit into a hydraulic tensioner body.
Figure 3:
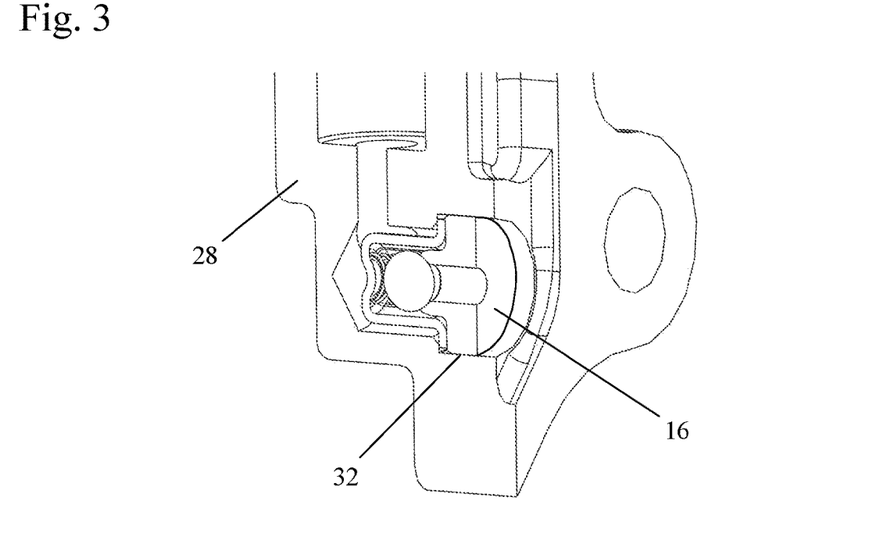
FIG. 3 shows a close-up view of the check valve region of the hydraulic tensioner assembly of FIG. 2.

In FIGS. 2-3, the check valve 10 has been press-fit into the check valve counterbore 32 of the hydraulic tensioner body 28 of a hydraulic tensioner. The piston counterbore 34 for the hydraulic piston (not shown), a connecting bore 35 providing a flow path between the piston counterbore 34 and the check valve 10, and a mounting bore 36 are also shown in FIG. 2. The check valve counterbore 32 is preferably cylindrical, and the seat 16 is screw machined with tight tolerances to provide retention of the check valve 10 in the check valve counterbore 32.

Figure 4:
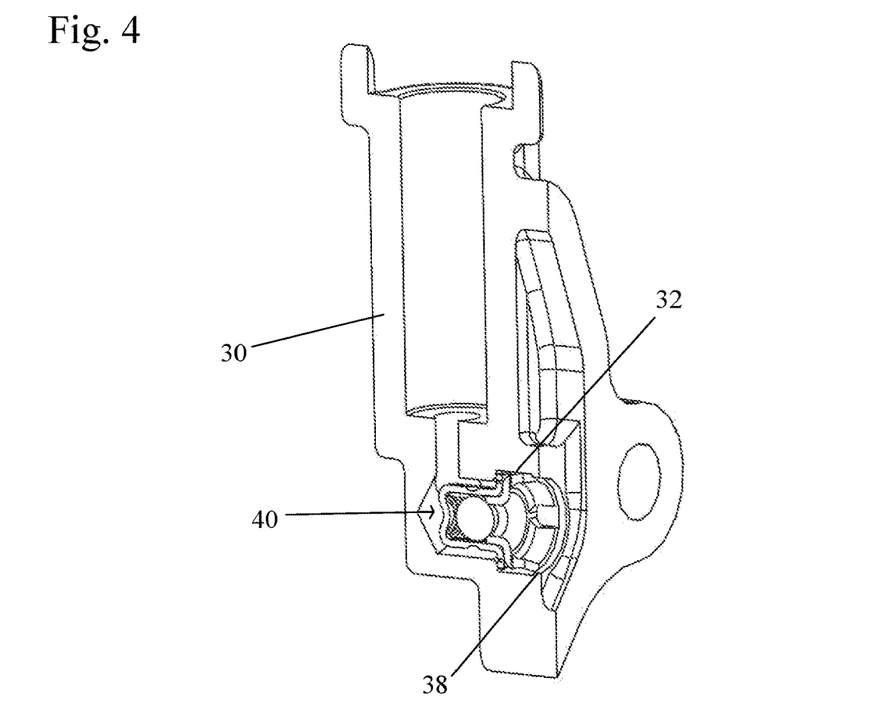
FIG. 4 shows a cross sectional perspective view of a check valve with a cup-shaped seat having legs press-fit into a hydraulic tensioner body in an embodiment of the present invention.
Figure 5:
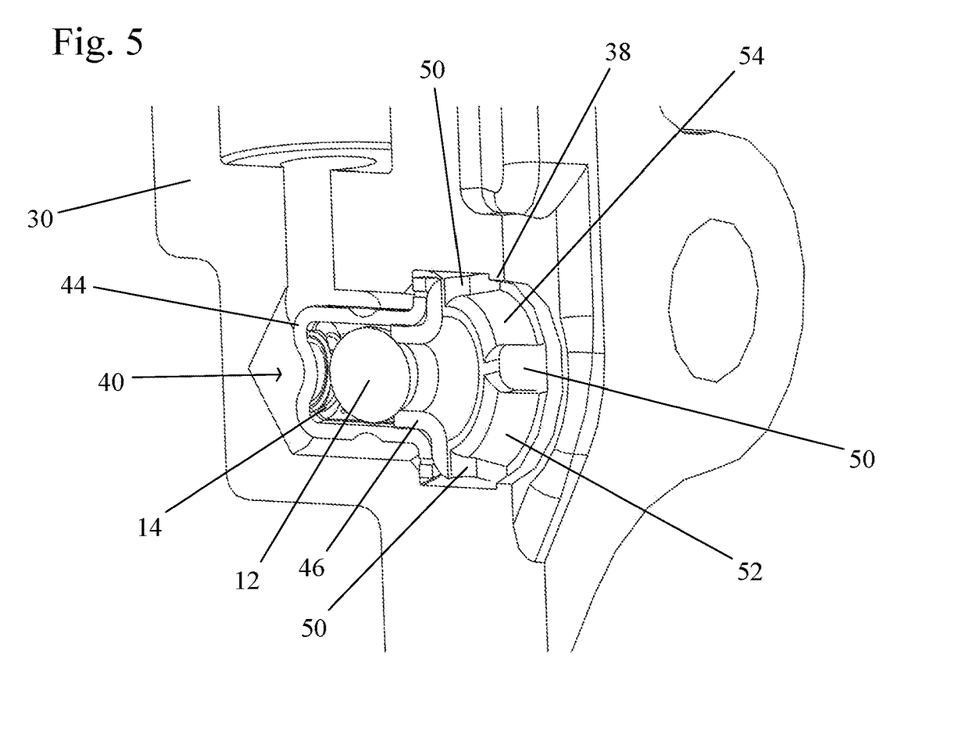
FIG. 5 shows a close-up cross sectional perspective view of the check valve region of the hydraulic tensioner assembly of FIG. 4.
Figure 6:
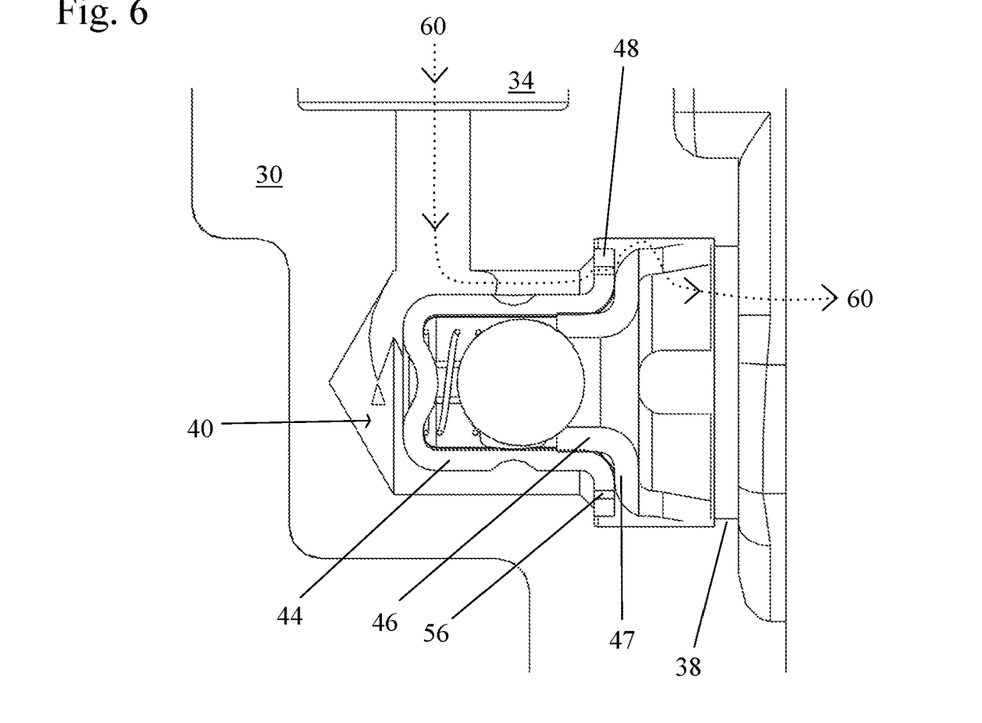
FIG. 6 shows a close-up cross sectional view of the check valve region of the hydraulic tensioner assembly of FIG. 4 showing a backflow path.

FIGS. 4-5 shows a check valve 40 with a cup-shaped seat 46 press-fit into the check valve counterbore 32 of a hydraulic tensioner body 30. The check valve counterbore 32 includes a lip 38 to aid in retention of the check valve 40. The check valve 40 also includes a ball 12, a spring 14, and a retainer 44. The leg openings 50 of the seat 46 defining the edges of the legs 52, 54 are more easily seen in FIG. 5 and FIG. 6. Two 52, 54 of the four legs are visible in the cross sectional view shown in FIG. 5. As best shown in FIG. 6, the seat 46 includes a shoulder 47 that contacts the bottom surface of the retainer flange 44 in the assembled press-fit check valve 40.

The leg openings 50, in combination with the flow passages 56 in the flange 48 of the retainer 44, provide a backflow path 60, as shown by the dotted line in FIG. 6, from the piston counterbore 34 to the hydraulic fluid reservoir (not shown). The backflow path 60 provides a metered backflow of hydraulic fluid from the piston counterbore 34 to the hydraulic fluid reservoir when the check valve 40 is in a closed position. Altering the size, location, shape, and number of flow passages 56 and leg openings 50 alters the metered backflow such that a desired metered backflow tuning for a check valve of a hydraulic tensioner for a given application may be provided.

In some situations, it is desirable not to have backflow from the high pressure chamber back to the hydraulic fluid reservoir. In the alternative embodiment shown in FIG. 7, the retainer flange 19 of the press-fit check valve 65 has no flow passages and forms a seal with the back wall of the check valve counterbore 32 to prevent backflow past the retainer flange 19 of the retainer 18 of the check valve 65. The seat 46 includes a shoulder 47 that contacts the bottom surface of the retainer flange 19 in the assembled press-fit check valve 65. Although the check valve counterbore 32 in FIG. 6 has a lip 38 and the check valve counterbore 32 in FIG. 7 has no lip, a lip 38 may be present or absent regardless of whether backflow is permitted by the check valve.

Figure 8:
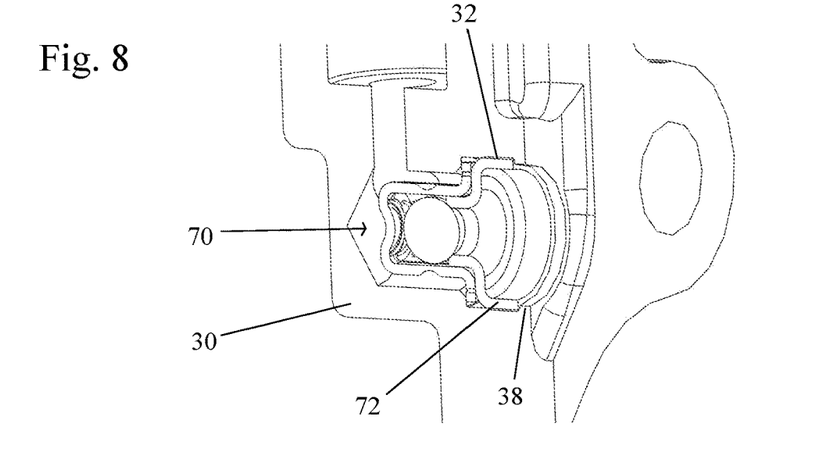
FIG. 8 shows a cross sectional perspective view of a check valve with a cup-shaped seat press-fit into a hydraulic tensioner body in an embodiment of the present invention.
Figure 9:
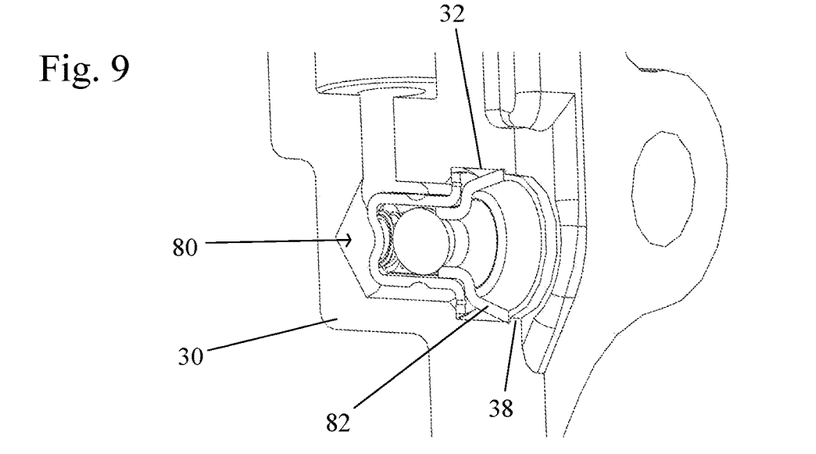
FIG. 9 shows a cross sectional perspective view of a check valve with a cup-shaped seat press-fit into a hydraulic tensioner body in another embodiment of the present invention.
Figure 10:
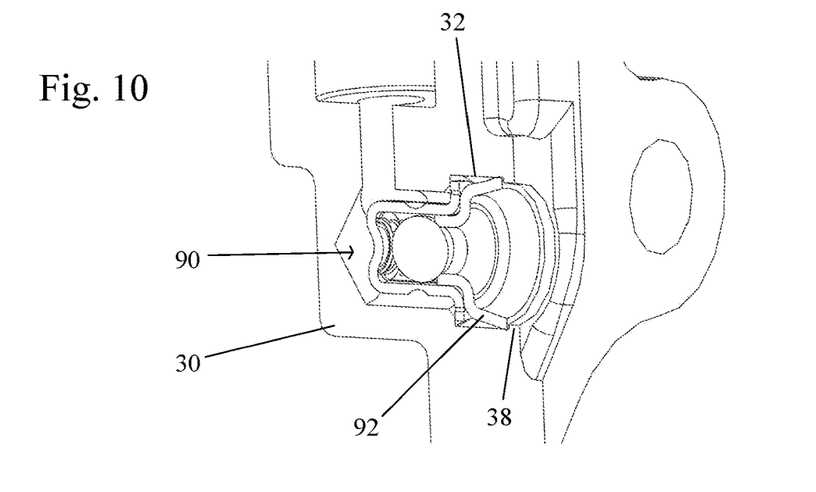
FIG. 10 shows a cross sectional perspective view of a check valve with a cup-shaped seat press-fit into a hydraulic tensioner body in yet another embodiment of the present invention.

The shape of the cup preferably provides the press force retention for the press-fit check valve. Any one of a number of different cup design profiles may be used within the spirit of the present invention depending on the desired press force retention. In FIG. 8, the lower portion of the profile of the seat 72 of the press-fit check valve 70 is at a low angle (substantially parallel) with respect to the wall defining the check valve counterbore 32. In FIG. 9, the lower portion of the profile of the seat 82 of the press-fit check valve 80 is at a large angle with respect to the wall defining the check valve counterbore 32. In FIG. 10, the lower portion of the profile of the seat 92 of the press-fit check valve 90 is at an intermediate angle with respect to the wall defining the check valve counterbore 32. Although the seats 72, 82, 92 are shown without legs and leg openings in FIG. 8, FIG. 9, and FIG. 10, legs and leg openings having the shown profiles may be used within the spirit of the present invention. Although the tensioner bodies 30 are shown with lips 38 in FIG. 8, FIG. 9, and FIG. 10, the illustrated check valves 70, 80, 90 may alternatively be press-fit into the check valve counterbore 32 of a hydraulic tensioner body 28 without a lip.

Figure 11:
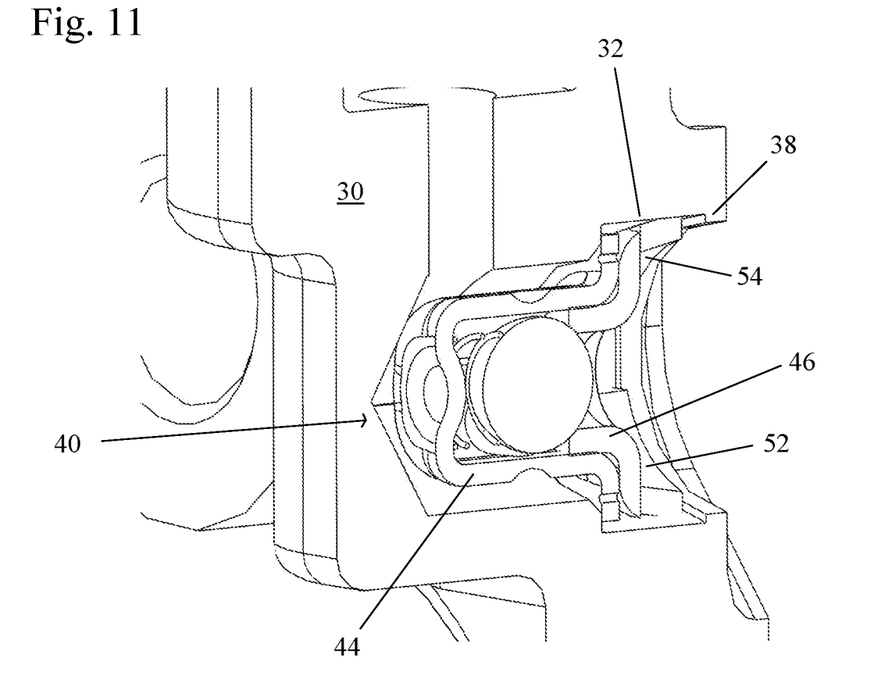
FIG. 11 shows a cross sectional perspective rotated angle view relative to the view of FIG. 5 of the check valve and hydraulic tensioner body of FIG. 5.

In some embodiments, a snap undercut feature, or lip 38, as previously-described, may be used to provide counterbore retention. The retention by the lip 38 of the tensioner body 30 is more clearly seen from the angle of FIG. 11, which is essentially a rotated angle view with respect to the view of FIG. 5. In some such embodiments, the seat 46 of the press-fit check valve 40 is angled to have an outside diameter at the bottom greater than the inside diameter of the lip 38, preferably formed by an undercut of the check valve counterbore 32. The legs 52, 54 may flex inward slightly during press-fitting to allow the seat 46 to slide fully past the lip 38 but snap back after clearing the lip 38 to retain the check valve 40 in the counterbore 32.

Figure 12:
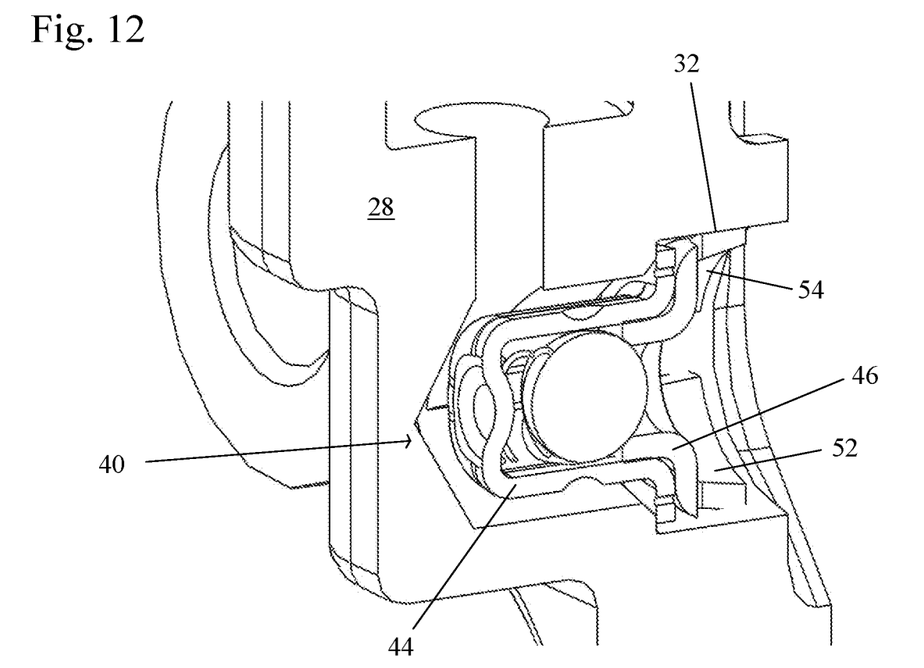
FIG. 12 shows the same cross sectional perspective view as in FIG. 11 of the check valve of FIG. 5 press-fit in the hydraulic tensioner body of FIG. 2.

In other embodiments, counterbore retention is provided without a snap undercut feature, as shown in FIG. 12. In such embodiments, the legs 52, 54 of the seat 46 of the press-fit check valve 40 are press-fit against the inner wall of the check valve counterbore 32 of the hydraulic tensioner body 28. In such embodiments, the legs 52, 54 pressing against the inner wall of the counterbore 32 alone provide the counterbore retention. In some embodiments, the press-fitting is done using conventional press-fitting methods.

Figure 13:
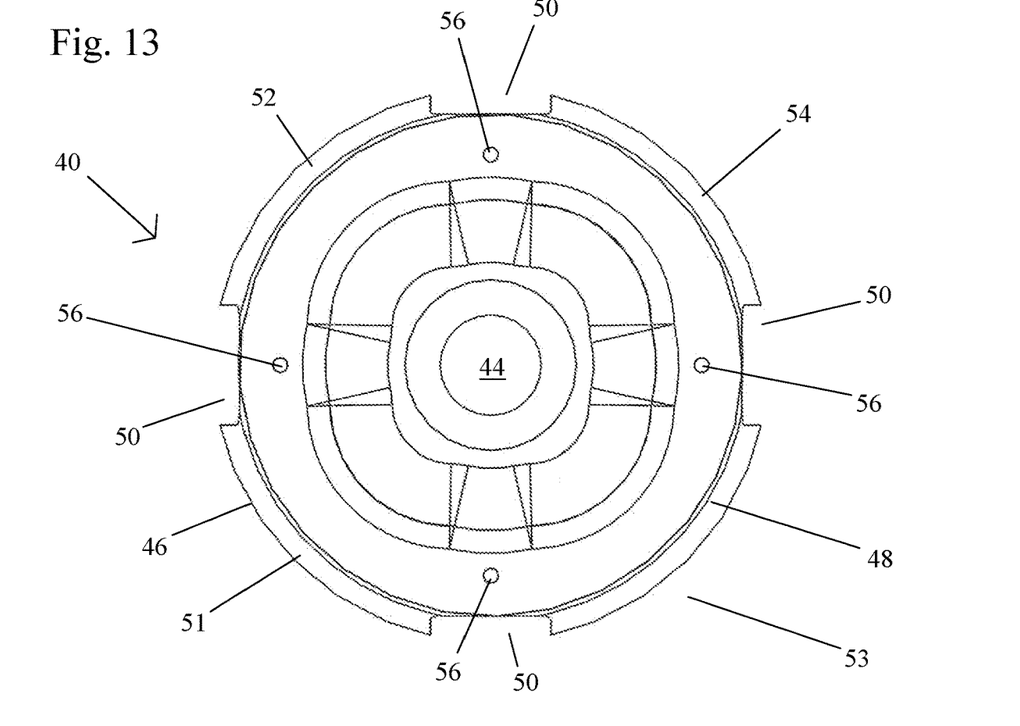
FIG. 13 shows a top view of the check valve of FIG. 4 showing the backflow holes in the retainer flange.

In FIG. 13, a top view of the check valve 40 from the hydraulic tensioner of FIG. 4 better shows the flow passages 56 through the flange 48 of the retainer 44 that allow for metered backflow. All four leg openings 50 and all four legs 51, 52, 53, 54 of the seat 46 and all four flow passages 56 in the retainer 44 are visible. Although the flow passages 56 are shown as aligned with the leg openings 50, the flow passages 56 may be offset from the leg openings 50 by rotationally adjusting the orientation of the seat 46 with respect to the retainer 44 to increase the path length of the backflow path.

Figure 7:
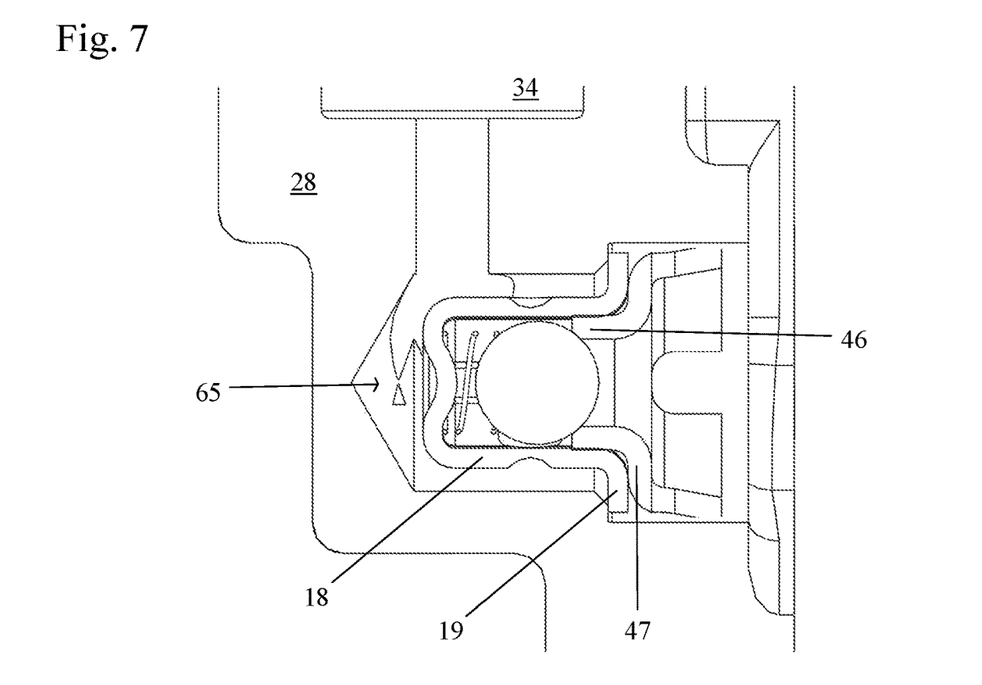
FIG. 7 shows a close-up cross sectional view of the check valve region of a hydraulic tensioner assembly without backflow in an embodiment of the present invention.
Figure 14:
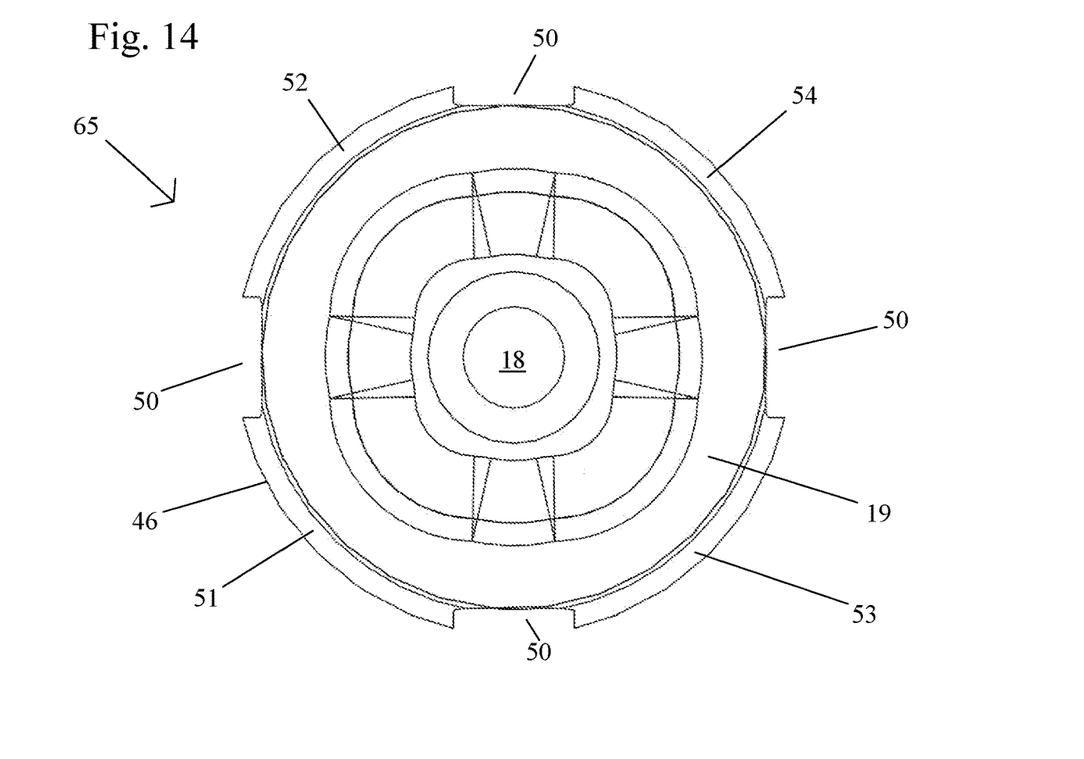
FIG. 14 shows a top view of the check valve of FIG. 7 having no backflow holes in the retainer flange.

FIG. 14 shows a top view of the check valve 65 from the hydraulic tensioner of FIG. 7 to better show the flange 19 of the retainer 18 that prevents backflow. All four leg openings 50 and all four legs 51, 52, 53, 54 of the seat 46 are also visible.

Figure 15:
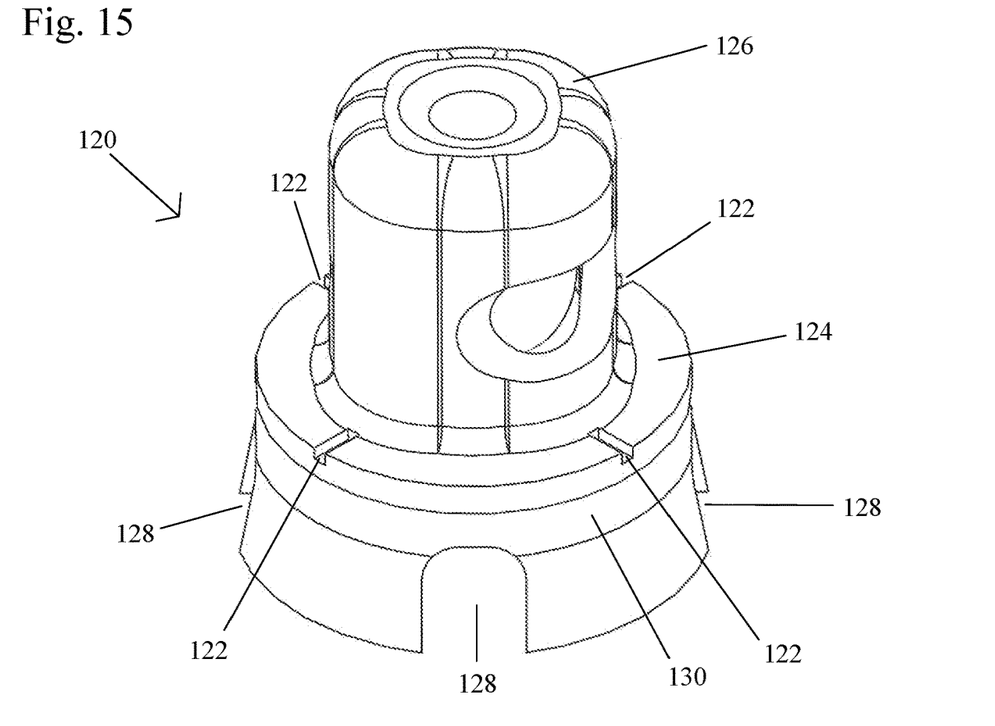
FIG. 15 shows a perspective view of a check valve with straight flow slots for backflow in an embodiment of the present invention.

Alternative metered backflow paths in the retainer flange may be used to permit backflow from the top of the flange 124, 144 to the outer edge of the flange 124, 144 instead of backflow from top to bottom through the flange 48. In FIG. 15, flow slots 122 extend radially outward as grooves in the top of the flange 124 of the retainer 126 of the check valve 120. Since the top surface of the flange 124 is pressed against the tensioner body, the inner portion of the flow slot 122 is accessible to the hydraulic fluid from the piston counterbore 34, and the outer portion of the flow slot 122 is accessible to the fluid reservoir by way of the check valve counterbore 32 and the leg openings 128. The backflow of hydraulic fluid must go through the flow slots 122 to get past the flange 124. The number, size, and shape of the flow slots 122 may be selected to provide a predetermined metering of the backflow. Although the flow slots 122 are shown as being fully offset from the leg openings 128 of the seat 130 in FIG. 15 to maximize the length of the backflow path, any level of offset, or no offset, may be used within the spirit of the present invention.

Figure 16:
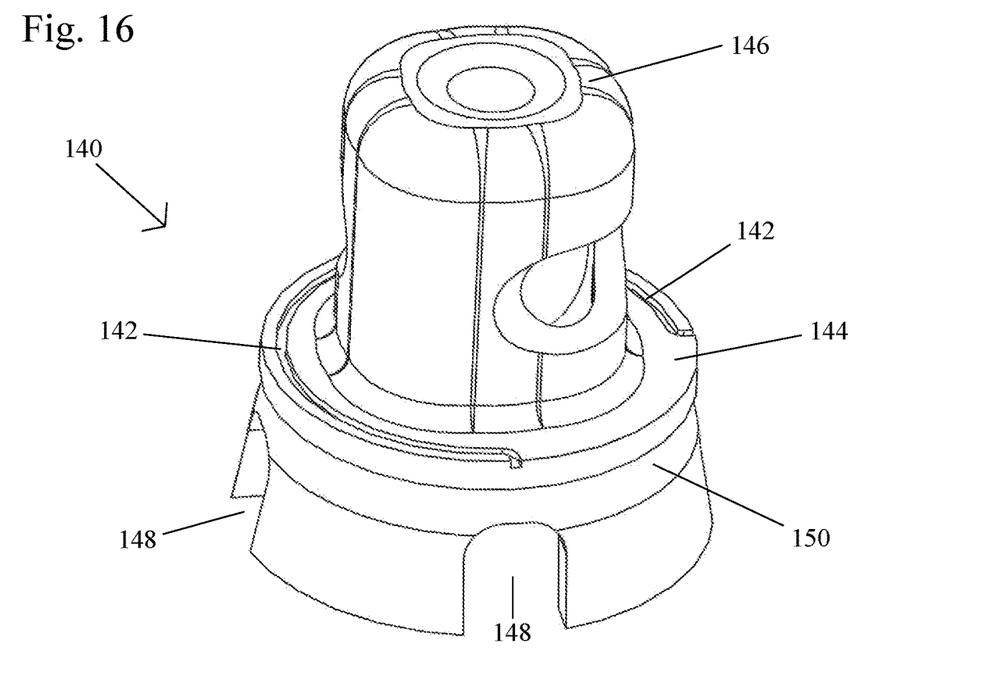
FIG. 16 shows a perspective view of a check valve with tortuous flow slots for backflow in an embodiment of the present invention.

Finally, FIG. 16 shows a more tortuous metered backflow path in the flange 144 of the retainer 146 of the check valve 140. A flow slot 142 extends circumferentially as a groove in the top of the flange 144 about three-quarters of the way around with the ends of the groove extending radially to the outer edge of the flange 144. Since the top surface of the flange 144 is pressed against the tensioner body, the backflow of hydraulic fluid must go through the flow slot 142 to get past the flange 144. In some embodiments, one or more sections of the circumferential part of the flow slot 142 are completely covered by the tensioner body in the assembled hydraulic tensioner. In other embodiments, the circumferential part is partially covered by the tensioner body in the assembled hydraulic tensioner. The location, size, and shape of the flow slot 142 may be selected to provide a predetermined metering of the backflow. Although the ends of the flow slot 142 are shown as being aligned with the leg openings 148 of the seat 150 in FIG. 16, any level of offset may alternatively be used within the spirit of the present invention. Although a single flow slot 142 is shown extending circumferentially about three-quarters of the way around with the ends extending radially to the outer edge of the flange 144, any circumferential groove length and any number of flow slots may be used within the spirit of the present invention.

Although certain figures show a seat with legs and leg openings at the outer end of the seat and certain other figures show a seat with no legs or leg openings, the seats of any of the shown or described press-fit check valves may be formed either with or without legs and leg openings within the spirit of the present invention, unless backflow is desired, in which case a seat having at least two leg openings is preferred.

Although the profile defining the edge between the legs and the leg openings in the figures is shown as generally having a curved, arched, scalloped shape, or any shape that provides retention in the check valve counterbore and a flow path to allow metered backflow, if desired, may be used within the spirit of the present invention.

Although certain figures show a tensioner body with a lip at the outer end of the check valve counterbore and certain other figures show a tensioner body with no lip, any of the shown or described press-fit check valves may be press-fit in either a tensioner body with a lip at the outer end of the check valve counterbore or a tensioner body with no lip within the spirit of the present invention.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A check valve for press-fitting into a check valve counterbore of a hydraulic tensioner body, the check valve comprising:
   a retainer comprising an open retainer end, a closed retainer end opposite the open retainer end, a cylindrical sidewall extending between the open retainer end and the closed retainer end, the retainer sidewall having a retainer flange at the open retainer end, and at least one retainer opening extending through the cylindrical sidewall;
   a seat comprising a cup-shaped seat wall having a radially-symmetric profile tapering from a first open end to a second open end and having a shoulder between the first open end and the second open end, the shoulder contacting the retainer flange, wherein a seat opening extends through the seat forming a cavity between the retainer and the seat, and wherein the first open end of the seat is press-fittable to the cylindrical wall of the check valve counterbore, the seat further comprises a plurality of legs at the first open end separated by leg openings;
   a ball received in the cavity, wherein the second open end of the seat is sealable by the ball; and
   a spring received in the cavity and having a first end contacting the retainer and a second end contacting the ball to bias the check valve toward a closed position with the ball sealing the seat opening.

2. The check valve of claim 1, wherein the retainer flange has at least one backflow slot permitting backflow of hydraulic fluid past the retainer flange, and wherein the backflow slot and the leg openings provide a backflow path from a piston counterbore in the hydraulic tensioner body to a pressurized hydraulic fluid reservoir.

3. The check valve of claim 2, wherein the at least one backflow slot is at least one flow passage through the retainer flange from a top surface of the retainer flange to a bottom surface of the retainer flange.

4. The check valve of claim 2, wherein the at least one backflow slot is at least one groove in a top surface of the retainer flange extending to an outer edge of the retainer flange.

5. A hydraulic tensioner comprising:
   a hydraulic tensioner body having a check valve counterbore; and
   a check valve press-fit into the check valve counterbore, the check valve comprising:
      a retainer comprising an open retainer end, a closed retainer end opposite the open retainer end, a cylindrical sidewall extending between the open retainer end and the closed retainer end, the retainer sidewall having a retainer flange at the open retainer end, and at least one retainer opening extending through the cylindrical sidewall;
      a seat comprising a cup-shaped seat wall having a radially-symmetric profile tapering from a first open end to a second open end and having a shoulder between the first open end and the second open end, the shoulder contacting the retainer flange, wherein a seat opening extends through the seat and a cavity is formed between the retainer and the seat, and wherein the first open end of the seat is press-fit to the cylindrical wall of the check valve counterbore, the seat further comprises a plurality of legs at the first open end separated by leg openings;
      a ball received in the cavity, wherein the second open end of the seat is sealable by the ball; and
      a spring received in the cavity and having a first end contacting the retainer and a second end contacting the ball to bias the check valve toward a closed position with the ball sealing the seat opening.

6. The hydraulic tensioner of claim 5, wherein the hydraulic tensioner body comprises a lip at an outer end of the check valve counterbore and the lip prevents the first open end of the seat from backing out of the check valve counterbore.

7. A hydraulic tensioner comprising:
a hydraulic tensioner body having a check valve counterbore; and
a check valve press-fit into the check valve counterbore, the check valve comprising:
a retainer comprising an open retainer end, a closed retainer end opposite the open retainer end, a cylindrical sidewall extending between the open retainer end and the closed retainer end, the retainer sidewall having a retainer flange at the open retainer end, and at least one retainer opening extending through the cylindrical sidewall;
a seat having a first open end, a second open end opposite the first open end, a shoulder between the first open end and the second open end contacting the retainer flange to form a cavity between the retainer and the seat, a seat opening extending through the seat, and a plurality of legs at the first open end separated by leg openings, the legs being press fit to a cylindrical wall of the check valve counterbore;
a ball received in the cavity and seating in the second open end of the seat; and
a spring received in the cavity and having a first end contacting the retainer and a second end contacting the ball to bias the check valve toward a closed position with the ball seated in the second open end of the seat to seal the seat opening.

8. The hydraulic tensioner of claim 7, wherein the retainer flange has a top surface contacting a back surface of the check valve counterbore and a bottom surface opposite the top surface and contacting the shoulder of the seat, wherein the retainer flange has at least one backflow slot permitting backflow of hydraulic fluid past the retainer flange, and wherein the backflow slot and the leg openings provide a backflow path from a piston counterbore in the hydraulic tensioner body to a pressurized hydraulic fluid reservoir.

9. The hydraulic tensioner of claim 8, wherein the at least one backflow slot is at least one flow passage through the retainer flange from a top surface of the retainer flange to a bottom surface of the retainer flange.

10. The hydraulic tensioner of claim 8, wherein the at least one backflow slot is at least one groove in a top surface of the retainer flange extending to an outer edge of the retainer flange.

11. The hydraulic tensioner of claim 7, wherein the hydraulic tensioner body comprises a lip at an outer end of the check valve counterbore and the lip prevents the first open end of the seat from backing out of the check valve counterbore.

12. The hydraulic tensioner of claim 7, wherein the seat is cup-shaped, comprising a seat wall having a radially-symmetric profile tapering from the first open end to the second open end.

* * * * *